United States Patent [19]

Gaussens et al.

[11] 4,230,766

[45] Oct. 28, 1980

[54] FIBER-BASE COMPOSITE MATERIAL HAVING HIGH TENSILE STRENGTH

[75] Inventors: Gilbert Gaussens, Meudon; Francis Lemaire, Chatillon; Bach Van Nguyen, Bures-sur-Yvette, all of France

[73] Assignee: Commissariat a l'Energie Atomique, Paris, France

[21] Appl. No.: 942,032

[22] Filed: Sep. 13, 1978
(Under 37 CFR 1.47)

[30] Foreign Application Priority Data

Sep. 16, 1977 [FR] France .................. 77 28001

[51] Int. Cl.³ .................. D04H 1/58; B32B 27/30; B32B 27/38

[52] U.S. Cl. .................. 428/288; 204/159.16; 204/159.15; 204/159.22; 204/159.23; 427/54.1; 427/177; 427/386; 428/371; 428/394; 428/395; 428/396; 428/413; 428/476.9; 428/500; 428/522; 428/367; 427/389.9

[58] Field of Search .................. 428/367, 288, 522, 375, 428/394, 476.9, 413, 395, 396, 500; 204/159.16, 159.23, 159.15, 159.22; 427/54.1, 386, 390 R, 177

[56] References Cited

U.S. PATENT DOCUMENTS

| 3,301,743 | 1/1967 | Fekete | 525/531 |
|---|---|---|---|
| 3,373,075 | 3/1968 | Fekete | 525/531 |
| 3,428,518 | 2/1969 | Schafer | 428/430 |
| 3,940,537 | 2/1976 | Burns | 428/288 |
| 4,026,826 | 5/1977 | Yoshida | 204/159.16 |
| 4,049,867 | 9/1977 | Ito | 204/159.13 |
| 4,055,697 | 10/1977 | Schmanski | 428/367 |
| 4,071,425 | 1/1978 | Guarino | 204/159.16 |
| 4,107,128 | 8/1978 | Hosoi | 428/367 |
| 4,156,035 | 2/1979 | Tsao | 204/159.16 |

FOREIGN PATENT DOCUMENTS 1549956 12/1968 France .
2087289 12/1971 France .

OTHER PUBLICATIONS

Modern Plastics, Mar. 1976, pp. 42 and 43.

Primary Examiner—Ellis P. Robinson
Attorney, Agent, or Firm—Kerkam, Stowell, Kondracki & Clarke

[57] ABSTRACT

The fibers constituting the composite material are impregnated with a composition containing at least one unsaturated epoxy resin mixed with at least two ethylenic monounsaturation monomers, at least one ethylenic polyunsaturation monomer, a photoinitiator and an organic peroxide. The composition is prepolymerized by means of ultraviolet rays in a first step and then cross-linked either by ultraviolet rays or a temperature rise in a second step.

9 Claims, No Drawings

FIBER-BASE COMPOSITE MATERIAL HAVING HIGH TENSILE STRENGTH

This invention relates to a fiber-base composite material having high tensile strength.

It is already a known practice to make use of composite materials containing fibers, especially glass and boron fibers incorporated in a material of lower strength which performs the function of a matrix such as a thermosetting resin, said fibers being thus intended to reinforce the composite material. There can be mentioned in particular a material described in French patent application No. EN 75 39 372 of Dec. 22, 1975 in the name of the present applicant, in which glass fibers are incorporated in a composition containing at least one monosaturated acrylic monomer and at least one polyunsaturated acrylic monomer, this composition being hardened under exposure of ultraviolet radiation.

It has already been attempted to fabricate high-strength fiber-base composites such as fibers having a base of aromatic polyamide and marketed under the name of Kevlar fibers. In order to obtain composites of this type, the Kevlar fibers have been incorporated in conventional epoxy resins (containing end-of-chain epoxy bridges) which have been subjected to polyaddition under the action of temperature by means of hardeners such as polyamides, acid polyanhydrides or Lewis acids (such as boron-monoethylamine trifluoride, for example). The composites thus obtained have failed to provide satisfactory properties. In point of fact, the temperature rise required in order to obtain polymerization of the mixture resulted in a certain degradation of the Kevlar fibers and in the appearance of flaws at the fiber-resin interface.

The present invention is precisely directed to a novel composite material which is based on fibers having high tensile strength such as carbon fibers or Kevlar fibers and which has advantageous properties.

The composite material in accordance with the invention is distinguished by the fact that the fibers which have high tensile strength are impregnated with a composition containing at least one unsaturated epoxy resin mixed with at least two ethylenic monounsaturation monomers, at least one ethylenic polyunsaturation monomer, a photoinitiator and an organic peroxide, said composition being prepolymerized by means of ultraviolet rays in a first step and then cross-linked in a second step.

The composition can be cross-linked in the second step either by the ultraviolet rays or by an increase in temperature.

The epoxy resins employed are epoxy resins unsaturated by acrylic acid or methacrylic acid which have a double-bond index within the range of 0.10 to 0.40 (the double-bond index corresponds to the double-bond number in respect of 100 g of resin). The starting saturated epoxy resins designated hereinafter as epoxy resin (ER) which are resins obtained by polycondensation of epichlorhydrin and of bisphenol A have an epoxy index within the range of 0.48 to 0.57 or within the range of 0.19 to 0.22 (the epoxy index corresponds to the number of epoxy functions in respect of 100 g of resin). The composition contains 30 to 60% by weight of unsaturated epoxy resin consisting either of a single chemical type or of a mixture of several chemical types.

One of the two ethylenic monounsaturation monomers which is capable of improving the reactivity of the composition is selected from the group comprising vinyl-pyrrolidone, 2-vinyl-pyridine, 4-vinyl-pyridine, 2-vinyl-5-ethyl-pyridine, dimethyl-amino-ethyl methacrylate, methoxy-ethyl acrylate, butoxy-ethyl acrylate. The composition contains one of these monomers or a mixture of said monomers in a proportion of 5 to 30% by weight.

One of the two ethylenic monounsaturation monomers which ensures wettability of the fibers impregnated with the composition is a monoacrylic monomer selected from the group comprising butyl acrylate, butyl methacrylate, isobutyl acrylate, isobutyl methacrylate. The composition contains one of these monomers or a mixture of said monomers in a proportion of 5 to 40% by weight.

The ethylenic polyunsaturation monomer is selected from the group consisting of hexane-diol diacrylate, diethylene-glycol diacrylate, tetraethylene-glycol diacrylate, polyethylene-glycol diacrylate, pentaerythritol tetraacrylate. The composition contains one of these monomers or a mixture of said monomers in a proportion of 5 to 25% by weight.

The photoinitiator employed is selected from the group consisting of benzoyl, methylether, benzophenone, naphthalene sulphochloride, vicure-10, vicure-30, trigonal-14, trigonal-15. The composition contains one of these photoinitiators in a proportion of 1 to 5% by weight.

The organic peroxide employed is selected from the group consisting of benzoyl peroxide, lauroyl peroxide, cyclohexanone peroxide. The composition contains said peroxide in a proportion of 1 to 5% by weight.

The invention also has for its object the method of fabrication of a fiber-base composite material having high tensile strength. This method is distinguished by the fact that said fibers are impregnated with a composition containing at least one unsaturated epoxy resin mixed with at least two ethylenic monounsaturation monomers, at least one ethylenic polyunsaturation monomer, a photoinitiator and an organic peroxide, said composition being prepolymerized by means of ultraviolet rays in a first step and cross-linked in a second step.

In the second step, the composition is cross-linked either by ultraviolet rays or by an increase in temperature.

In accordance with a distinctive feature of the method of the invention, fabrication of the composite material can be performed by filament winding. This technique consists in impregnating the fibers which can be assembled together in the form of roving or strands by means of the composition which is then prepolymerized. The impregnated strand of the prepolymerized composition is then shaped by winding on a mandrel, final cross-linking being performed on completion of the shaping operation.

Spools of impregnated and prepolymerized strands can also be fabricated by impregnation of strands of fibers, prepolymerization of the composition with which these strands are thus impregnated, winding of the strands. The spools of prepolymerized strands thus obtained are stored, shaping and final cross-linking being carried out only at a later stage.

The method in accordance with the invention can advantageously be carried out by means of the device described in French patent application No. EN 75 39 372 of Dec. 22, 1975 in the name of the present applicant.

The method in accordance with the invention offers a certain number of advantages which have beneficial effects on the qualities of the composite material obtained.

In order to ensure wettability of the fibers, the use of monoacrylic monomers having low surface tension makes it possible to obtain good results from this point of view. It is worthy of note that the surface tension of a Kevlar fiber is approximately 45 dynes per cm, the surface tension of an epoxy resin is 44 to 45 dynes per cm and that of a monoacrylic monomer is 27 to 35 dynes per cm.

The use of ultraviolet radiation in order to produce cross-linkage or at least prepolymerization of the composition with which the fibers are impregnated offers an advantage in that this irradiation takes place practically without any temperature rise; and if the temperature rise is then subsequently employed for final cross-linking, said temperature rise is relatively small (80° to 100° C. for a period of 6 to 16 hours). The small temperature rise which is necessary makes it possible to prevent thermal degradation of the Kevlar fibers to a large extent and also to prevent the appearance of certain flaws at the fiber-resin interface which would otherwise result from differences existing between the coefficients of thermal expansion of the fiber and of the resin.

The rate of polymerization under ultraviolet radiation can be very high. Moreover, this polymerization under ultraviolet radiation can readily be controlled and the polymerization rate can be adjusted to a preselected value. Polymerization under ultraviolet radiation can be stopped at any moment and then resumed, thus making it possible to carry out winding and immediate curing operations.

The reactivity of the impregnation solution as well as the rate of transfer of the strand of Kevlar fibers under ultraviolet rays make it possible to adjust the degree of polymerization of the resin.

The composite materials in accordance with the invention thus have very good mechanical properties. In fact, the properties of Kevlar or carbon fibers which have high inherent tensile strength and a relatively low density have been turned to useful account. By reason of the fact that cross-linking of the composition with which these fibers are impregnated does not entail the need for a substantial temperature rise, this accordingly prevents thermal degradation of the Kevlar fibers which are known to have low strength at high temperatures.

There is given below by way of indication a comparative table which shows the mechanical properties on the one hand of a strand of non-impregnated Kevlar fibers and, on the other hand, a strand of Kevlar fibers impregnated with a composition which was prepolymerized under ultraviolet radiation, then cross-linked at a temperature of 90° C. for a period of 16 hours. This impregnation composition consisted of 45% of an unsaturated epoxy resin and 50% of a mixture of vinyl-pyrrolidone, isobutyl methacrylate and hexane-diol diacrylate.

|  | Breaking strength | Elongation at rupture | Tensile strength |
| --- | --- | --- | --- |
| non-impregnated strands | 65 to 70 kg | 1.65 to 1.75% | 10,500 to 11,500 kg/mm² |
| impregnated strands | 95 to 105 kg | 1.9 to 2% | 13,000 to 14,000 kg/mm² |

A few examples of fabrication of the composite material in accordance with the invention are given below.

EXAMPLE 1

Kevlar fibers are coated with a composition having the following formulation:

40% of a mixture of resin composed of ¾ of an epoxy resin (ER) modified by methacrylic acid having a double bond index of 0.19 and ¼ of an epoxy resin modified by acrylic acid having a double-bond index of 0.35, 23% vinyl-pyrrolidone, 23% isobutyl methacrylate, 10% hexane-diol diacrylate, 2% vicure-30, 2% benzoyl peroxide.

The fibers thus coated are passed under an ultraviolet radiation generator having a power of 5 kW at a speed of 24 m per minute. On completion of irradiation, the material obtained has a sufficient degree of prepolymerization to permit of winding on a mandrel. After winding, the material obtained is subjected either to a second irradiation with ultraviolet rays at a rate of transfer of 16 m per minute or to curing at 90° C. for a period of 10 hours. The composite material thus obtained is fully cross-linked and has satisfactory characteristics.

EXAMPLE 2

Kevlar fibers are coated with a composition having the following formulation:

50% of an epoxy resin (ER) modified by acrylic acid having a double-bond index of 0.24, 20% vinyl-pyrrolidone, 15% butyl acrylate, 10% polyethylene-glycol diacrylate, 3% trigonal-15, 2% benzoyl peroxide.

The fibers thus coated are passed under ultraviolet radiation at a speed of 21 m per minute. The material thus produced has attained a sufficient degree of prepolymerization to permit of winding of said material. After winding, the material is subjected either to a second irradiation under ultraviolet rays at a rate of transfer of 17 m per minute or to curing at 80° C. for a period of 16 hours. The composite material is then fully cross-linked and has satisfactory mechanical characteristics.

EXAMPLE 3

Kevlar fibers are coated with a composition having the following formulation:

50% of an epoxy resin (ER) modified by acrylic acid having a double-bond index of 0.35, 20% 2-vinyl-pyridine, 5% methoxy-ethyl acrylate, 15% isobutyl methacrylate, 5% tetraethylene-glycol diacrylate, 2% vicure-30, 3% lauroyl peroxide.

After irradiation of the fibers thus coated at a rate of 12 m per minute, the material thus produced has attained a sufficient degree of prepolymerization to permit of winding. On completion of the winding operation, the material is subjected either to a second irradiation with ultraviolet rays at a rate of 15 m per minute or to curing at 90° C. for a period of 16 hours.

EXAMPLE 4

Kevlar fibers are coated with a composition having the following formulation:
- 55% of an epoxy resin (ER) modified by methacrylic acid having a double-bond index of 0.35,
- 15% vinyl-pyrrolidone,
- 16% isobutyl methacrylate,
- 10% pentaerythritoltetra-acrylate,
- 2% methyl-ether benzoin,
- 2% benzoyl peroxide.

After the fibers which have thus been coated have been passed under ultraviolet radiation at a rate of 24 m per minute, the material produced has attained a sufficient degree of prepolymerization to permit of winding. On completion of the winding operation, the material is subjected either to a second irradiation under ultraviolet rays at a speed of 21 m per minute or to curing at 85° C. for a period of 10 hours.

EXAMPLE 5

Carbon fibers are coated with a composition having a formulation which is identical with that of the composition employed in Example 1.

The fibers thus coated are passed under ultraviolet radiations at a speed of 18 m per minute, the degree of prepolymerization thus attained being sufficient to permit of winding. After the winding operation, the material thus produced is subjected either to a second irradiation under ultraviolet rays at a rate of 12 m per minute or to curing at 90° C. for a period of 10 hours.

The high tensile strength fiber-base composite materials in accordance with the invention have very good mechanical properties. Tests have thus been performed on a spool having a diameter of 300 mm, a total length of 400 mm, a wall thickness of 2.3 mm and formed of a composite material fabricated in accordance with Example 1. Said spool was subjected to a number of different mechanical tests, viz: measurement of the breaking strength on one strand, measurement of resistance to interlaminar shear on a Noll ring, disintegration of the winding.

The strand breaking strength is approximately 200 hbar.

The mechanical tests on a Noll ring serve to measure the interlaminar shear of a composite material; this measurement is performed by determining the resistance of the different layers of the winding to interlaminar separation. The results obtained give shear stresses within the range of 1.90 to 2.05 hbar.

At the time of disintegration of the winding, the following characteristics were determined:
- rupture pressure: 131 bar,
- mode of rupture: circumferential,
- overall stress: 81 hbar,
- circumferential stress within the fiber: 210 hbar,
- longitudinal stress within the fiber: 197 hbar,
- performance factor (disintegration pressure×volume/mass×gravity): 29.8 kilo×meter.

The composite materials in accordance with the invention which have both lightness of weight and high strength can find an advantageous application in the aeronautical field.

We claim:

1. A fiber-base composite material having high tensile strength, obtained by impregnating fibers with a composition containing at least one unsaturated epoxy resin having a double bond index within the range of 0.10 to 0.40, obtained by modifying a saturated epoxy resin by acrylic acid or methacrylic acid, at least a first ethylenically unsaturated monomer selected from the group consisting of vinyl-pyrrolidone, 2-vinyl-pyridine, 4-vinyl-pyridine, 2-vinyl-5-methyl-pyridine, methylamino-ethyl methacrylate, methoxy-ethyl acrylate, butoxy-ethyl acrylate, at least a second ethylenically unsaturated monomer selected from the group consisting of butyl acrylate, butyl methacrylate, isobutyl acrylate, isobutyl methacrylate, at least one ethylenically polyunsaturated monomer selected from the group consisting of hexane-diol diacrylate, diethyleneglycol diacrylate, tetraethyleneglycol, diacrylate, polyethyleneglycol diacrylate, pentaerythritol tetraacrylate, a photoinitiator and an organic peroxide, said composition comprising 30–60% by weight of said unsaturated epoxy resin, 5–30% by weight of said first monomer, 5–40% by weight of said second monomer, 5–25% by weight of said polyunsaturated monomer, 1–5% by weight of said photoinitiator and 1–5% by weight of said organic peroxide, by prepolymerizing said composition by means of ultraviolet rays in a first step, and then cross-linking said composition in a second step.

2. A material according to claim 1, wherein said composition is cross-linked in the second step by means of ultraviolet rays.

3. A material according to claim 1, wherein said composition is cross-linked in the second step by means of a temperature rise.

4. A material according to claim 1, wherein said fibers are constituted by aromatic polyamide fibers having high tensile strength.

5. A material according to claim 1, wherein said fibers are constituted by carbon fibers.

6. A method of fabrication of a fiber-base material having high tensile strength, wherein the fibers are impregnated with a composition containing at least one unsaturated epoxy resin having a double bond index within the range of 0.10 to 0.40, obtained by modifying a saturated epoxy resin by acrylic acid or methacrylic acid, at least a first ethylenically unsaturated monomer selected from the group consisting of vinyl-pyrrolidone, 2-vinyl-pyridine, 4-vinyl-pyridine, 2-vinyl-5-methyl-pyridine, methylaminoethyl methacrylate, methoxyethyl acrylate, butoxy-ethyl acrylate, at least a second ethylenically unsaturated monomer selected from the group consisting of butyl acrylate, butyl methacrylate, isobutyl acrylate, isobutyl methacrylate, at least one ethylenically polyunsaturated monomer selected from the group consisting of hexane-diol diacrylate, diethylene-glycol diacrylate, tetraethylene-glycol diacrylate, polyethylene-glycol diacrylate, pentaerythritol tetraacrylate, a photoinitiator and an organic peroxide, said composition comprising 30–60% by weight of said unsaturated epoxy resin, 5–30% by weight of said first monomer, 5–40% by weight of said second monomer, 5–25% by weight of said polyunsaturated monomer, 1–5% by weight of said photoinitiator and 1–5% by weight of said organic peroxide, said composition is prepolymerized by means of ultraviolet rays in a first step and then cross-linked in a second step.

7. A method according to claim 6, wherein the composition is cross-linked by means of ultraviolet rays in the second step.

8. A method according to claim 6, wherein the composition is cross-linked by means of a temperature rise in the second step.

9. A method according to claim 6, wherein said fibers are impregnated with said composition, the material obtained is subjected to said prepolymerization by ultraviolet rays, the material is shaped by winding on a mandrel and then subjected to said cross-linking step.

* * * * *